United States Patent [19]

Knäbel

[11] Patent Number: 5,000,068
[45] Date of Patent: Mar. 19, 1991

[54] DEVICE FOR ALIGNING, FIXING AND CLAMPING WORKPIECES

[75] Inventor: Horst Knäbel, Meerbusch, Fed. Rep. of Germany

[73] Assignee: Rheinmetall GmbH, Düsseldorf, Fed. Rep. of Germany

[21] Appl. No.: 323,935

[22] Filed: Mar. 15, 1989

[30] Foreign Application Priority Data

Mar. 15, 1988 [DE] Fed. Rep. of Germany ... 8803460[U]

[51] Int. Cl.⁵ ............................................. B23B 23/00
[52] U.S. Cl. ...................................... 82/150; 82/148
[58] Field of Search .............. 82/150, 162, 151, 152, 82/148

[56] References Cited

U.S. PATENT DOCUMENTS

| | | |
|---|---|---|
| 2,397,371 | 3/1946 | Reynolds . |
| 2,545,852 | 3/1951 | Korzweil et al. ............... 82/148 |
| 3,732,757 | 5/1973 | Cotlin ............................ 82/148 |
| 4,068,547 | 1/1978 | Ito et al. . |
| 4,370,907 | 2/1983 | Felice ............................ 82/150 |
| 4,406,193 | 9/1983 | Sugino et al. .................. 82/152 |

FOREIGN PATENT DOCUMENTS 3613410 4/1986 Fed. Rep. of Germany .

*Primary Examiner*—D. S. Meislin
*Attorney, Agent, or Firm*—Spencer & Frank

[57] ABSTRACT

A device for fixing and clamping a workpiece comprises an elongated housing having a central bore with a longitudinal central axis, and including a frontal portion having a radial collar, and a rearwardly tapered frontal face opposing the workpiece; a longitudinally displaceable centering mandrel located within the bore and displacable between an extended position wherein a first end of the mandrel extends beyond the frontal face, and a retracted position wherein the first end of the mandrel is positioned behind the frontal face, and an arrangement for moving the mandrel between the retracted and extended positions.

12 Claims, 1 Drawing Sheet

DEVICE FOR ALIGNING, FIXING AND CLAMPING WORKPIECES

REFERENCE TO RELATED APPLICATIONS

This application claims the priority of Federal Republic of Germany application Serial No. G 8803460.7 filed Mar. 15th, 1988, which is incorporated herein by reference.

BACKGROUND OF THE INVENTION

The present invention relates to a device for fixing and clamping workpieces, such as, for example, shafts, axles and the like, the device having a longitudinally displaceable central mandrel.

In connection with lathes, for example, it is known to accommodate, i.e. fix and hold, workpieces, particularly shafts and the like, in holding devices, with at least one of these holding devices being configured as a centering mandrel in a tailstock-like bracket, with the centering mandrel being brought mechanically, electrically, hydraulically or pneumatically to the workpiece. The workpiece can also be clamped in by clamping the workpiece between the bracket head members of the holding devices. In these cases, the workpiece is brought past the tip of the centering mandrel before it can be received between the tip or tips. There then exists the danger that the workpiece and/or the tip(s) may be damaged. In cases in which the workpiece is inserted manually, these tips additionally constitute a danger of injury.

SUMMARY OF THE PRESENT INVENTION

It is therefore an object of the present invention to provide a device for fixing and clamping workpieces, particularly shafts, axles and the like, which improves the introduction of the workpiece while avoiding the drawbacks of prior art devices so that damage to the workpiece and/or the head member of the centering mandrel and possible injury of operators is prevented.

This is accomplished by the device according to the present invention for fixing and clamping a workpiece, which includes: an elongated housing having a central bore with a longitudinal central axis and including a frontal portion having a radial collar, and a rearwardly tapered frontal face opposing the workpiece; a longitudinally displaceable centering mandrel located within the bore and displacable between an extended position, wherein a first end of the mandrel extends beyond the frontal face and a retracted position, wherein the first end of the mandrel is positioned behind the frontal face; and means for moving the mandrel between the retracted and extended positions.

According to the preferred embodiment of the invention, the frontal portion of the body includes a cut back portion which is recessed rearwardly from the frontal face and provides an opening from an outer circumferential surface of the collar to the longitudinal axis of the housing and extends at least around a portion of the circumference, and with the cut back portion being oriented in a direction which opposite the direction from which a workpiece is inserted into a position adjacent the device.

In an advantageous manner, the device according to the present invention provides for significantly easier insertion of the workpiece since the centering mandrel, which is longitudinally displaceable in the housing, can be retracted into the housing for insertion of the workpiece. This is applicable for manual installation as well as for installation by means of an automatic device which needs to be correspondingly less accurate since such an automatic insertion device is able to bring the workpiece to be inserted to within about 0.5 to 1 mm of the housing according to the invention before the workpiece is inserted.

A further advantage of the device according to the invention is that, if it is employed in measuring equipment, the particular configuration of the collar according to the invention creates a free space or aperture, for a sensor head of a measuring device, thereby enabling this sensor head to scan and measure the frontal face of the workpiece which is clamped in by way of the adjustable head member of the centering mandrel. The projecting part of the collar which is oriented toward the workpiece and tapers in the insertion direction advantageously protects the corresponding measuring device against damage by the workpiece during insertion of the workpiece.

BRIEF DESCRIPTION OF THE DRAWINGS

The invention will now be described in greater detail with reference to an embodiment that is illustrated in the drawings.

DETAILED DESCRIPTION OF A PREFERRED EMBODIMENT

Figure 1:
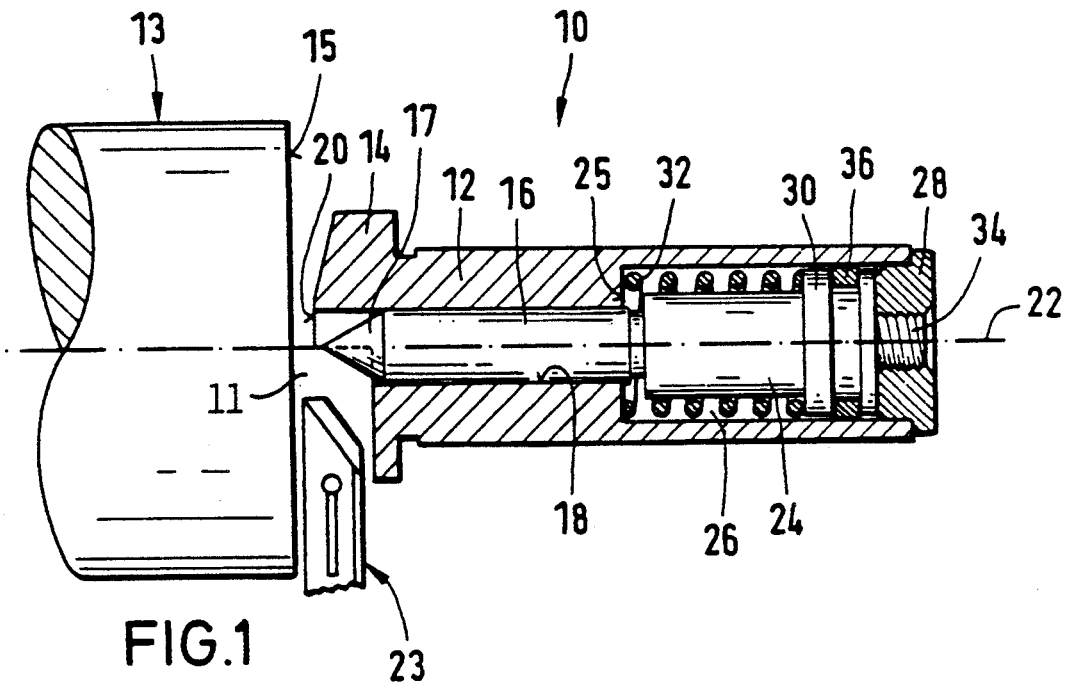
FIG. 1 is a longitudinal sectional side view of an embodiment of the device according to the invention, seen along section line I—I shown in FIG. 2.

The device 10 according to the invention includes a housing 12 with a frontal portion having a collar 14, wherein the frontal portion is outwardly and rearwardly tapered. The frontal face 20 of the frontal portion faces a face 15 of workpiece 13. Housing 12 includes a central front bore 18 to accommodate the centering mandrel 16 whose head member is a tip 17 which can be retracted into housing 12 behind the outer face 20, or brought up to the workpiece 13 before the workpiece 13 is fixed in place. FIG. 1 illustrates the device shortly after insertion of workpiece 13, with the mandrel 16 in its retracted position. The tip 17 of centering mandrel 16 is retracted into housing 12 behind the outer frontal face 20 and is partially surrounded and protected by projecting collar 14.

Figure 2:
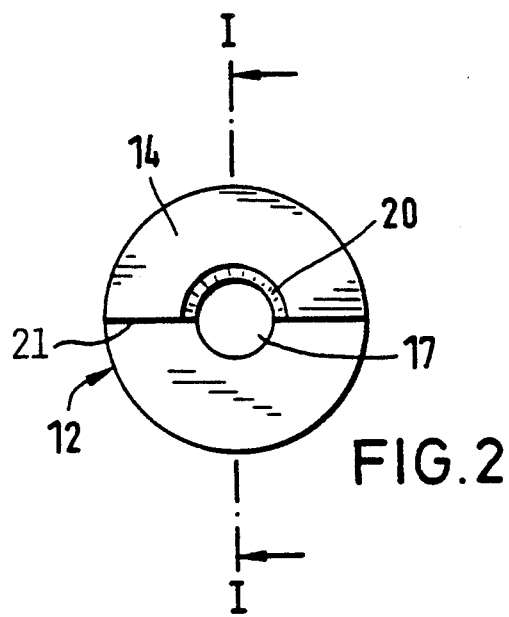
FIG. 2 is an end view of the workpiece facing frontal face of the device according to FIG. 1.

In its frontal region, a portion of the frontal portion and of collar 14 is cut back to form an opening 11, as illustrated in FIG. 1. The cut back region, which extends radially from the longitudinal axis 22 of the housing 12 to the outer circumferential surface of the collar 14, is defined by the half circle portion below diameter 21 in FIG. 2. The remaining portion of the frontal portion and collar 14 is tapered and oriented in the direction from which the workpiece 13 is inserted into a position to be engaged by the device 10 inserted. The opening 11 of the cut back portion makes it possible to have the frontal face 15 of the workpiece 13 scanned by a measuring sensor 23 inserted into opening 11, to thus monitor the face 15.

Centering mandrel 16 is connected with a rearward, cylindrical member 24 and a piston 30 connected thereto and following thereafter, with rear cylindrical member 24 and piston 30 being received by a central rear bore 26 in housing 12. The diameter of the central rear bore 26 is larger than the diameter of the central front bore 18 of housing 12. Centering mandrel 16, its connected to rear member 24. Piston 30 is arranged so as to be longitudinally displaceable in housing 12 along longitudinal axis 22.

A coil spring 32 is provided to return centering mandrel 16. It surrounds rear member 24 in central rear bore 26. Coil spring 32 is supported at an edge of piston 30 and finds an abutment at a frontal face 25 of central rear bore 26 so that centering mandrel 16 is charged or biased toward retraction with a spring force by coil spring 32.

The central rear bore 26 of housing 12 of device 10 is closed by a lid 28 which is provided with a connection 34 so that piston 30 can be charged-by a pneumatic or hydraulic pressure medium. Introduction of the pressure medium enables centering mandrel 16 to be moved against the spring force of coil spring 32 so as to advance the mandrel toward the workpiece 13 into an extended position where it will engage workpiece 13, thereby clamping workpiece 13 against a corresponding abutment (not illustrated). A seal 36 associated with piston 30 should be selected according to the magnitude of the actuating force required by the pressure medium and the type of pressure medium itself.

If two devices 10 according to the invention are employed for fixing and clamping in workpiece, particularly a shaft which must be centered at both ends, one of the devices is used as a fixed abutment. Preferably this is accomplished in that both devices are operated at different pressures or with differently configured, pressure charged faces on piston 30. The device which is used as the centering fixed abutment is preferably charged with pressure in such a manner that rear member 24 lies firmly against the frontal face 25 of rear central bore 26.

The device 10 according to the invention can be employed, without limiting the scope of the invention, for any working or measuring device 23 to be supplied with a workpiece. The head member tip 17 of centering mandrel 16 can be provided if desired, with different cone angles and can be selected to correspond to the task at hand so that even a spherical tip or a flat head member of centering mandrel 16 may be appropriate, depending on the task at hand and the workpiece to be clamped.

In use, with the mandrel in the retracted position, as illustrated in FIG. 1, the workpiece 13 is brought past frontal face 20 of collar 14 and is preferably initially deposited on an abutment, not illustrated, which lies somewhat lower than the centering tip 17. Next, a pressure medium is supplied to advance the mandrel 16 into an extended position, thereby engaging and raising the workpiece 13 by way of the extendable adjustable tip 17 of centering mandrel 16 to the desired position where the workpiece is clamped in place.

The foregoing description of an exemplary embodiment is for illustrative purposes, and is not to be read as limiting the scope of the present invention. Further embodiments of the present invention will be apparent to the skilled artisan given the forgoing description. These are to be considered within the scope of the present invention, which is defined by the claims which follow.

What is claimed is:

1. In a device for fixing and clamping a workpiece, comprising:

an elongated housing having a central bore with a longitudinal central axis, and including a frontal portion having a radial collar and a rearwardly tapered frontal face which opposes said workpiece and extends to an outer circumferential surface of said collar;

a longitudinally displaceable centering mandrel located within said bore and displaceable between an extended position, wherein a first end of said mandrel extends beyond said frontal face, and a retracted position, wherein said first end of said mandrel is positioned behind said frontal face; and means for moving said mandrel between said retracted and extended positions; the improvement wherein said frontal portion of said body includes:

a cut back portion recessed rearwardly from said frontal face and providing an opening which extends from said outer circumferential surface of said collar to said longitudinal axis, and at least around a portion of said circumference, whereby in use, the workpiece is inserted from the direction of the remaining non-cut back portion of said frontal portion.

2. The device of claim 1 wherein said housing includes a second bore adjacent to a rear end of said housing and concentric with said first bore, and said means for moving includes a piston located within said second bore.

3. The device of claim 2, further including cover means for covering said rear end of said housing, and connection means for a hydraulic or pneumatic pressure medium disposed in said cover means.

4. The device of claim 2 further including a cylindrical member connected to said piston and positioned within said second bore between said piston and said centering mandrel.

5. The device of claim 4 wherein said first end of said mandrel includes a head member with a conical tip having a desired cone angle.

6. The device of claim 4 wherein said means for moving further includes a coil spring disposed within said second bore and surrounding said cylindrical member for biasing said centering mandrel toward said retracted position.

7. The device of claim 6 wherein said second bore has a diameter greater than that of said first bore so that an annular radial ledge is formed within said housing; and said second bore has a diameter greater than that of said first bore so that an annular radial ledge is formed within said housing; and said coil spring has a first end abutting said ledge and a second end abutting said piston.

8. The device of claim 1 wherein said first end of said mandrel includes a head member configured as a conical tip.

9. The device of claim 1 wherein said first end of said mandrel includes a head member configured as a spherical tip.

10. The device of claim 1 wherein said first end of said mandrel includes a head member configured as a flat head tip.

11. The device of claim 1 wherein said means for moving includes means for biasing said mandrel toward said retracted position.

12. The device of claim 1 wherein said opening extends around approximately one half of said circumference.